US008341512B2

(12) United States Patent
Sol et al.

(10) Patent No.: US 8,341,512 B2
(45) Date of Patent: Dec. 25, 2012

(54) METHOD FOR CAPTURING DESIGN-TIME AND RUN-TIME FORMULAS ASSOCIATED WITH A CELL

(75) Inventors: Alisson A. S. Sol, Cambridge (GB); Luming Wang, Bellevue, WA (US); Xiaohong Mark Yang, Sammamish, WA (US); Patrick J. Baumgartner, Pullman, WA (US); Peter Eberhardy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1177 days.

(21) Appl. No.: 11/931,857

(22) Filed: Oct. 31, 2007

(65) Prior Publication Data

US 2009/0113283 A1      Apr. 30, 2009

(51) Int. Cl.
*G06F 17/00* (2006.01)
*G06F 17/20* (2006.01)
*G06F 17/21* (2006.01)

(52) U.S. Cl. .......................... 715/212; 715/215; 715/222

(58) Field of Classification Search .................. 715/212, 715/215, 222
See application file for complete search history.

(56) References Cited

U.S. PATENT DOCUMENTS

| 5,604,854 | A * | 2/1997 | Glassey ......................... 715/209 |
| 5,897,649 | A | 4/1999 | Kennedy ....................... 715/210 |
| 6,631,497 | B1 | 10/2003 | Jamshidi ....................... 715/205 |
| 8,095,499 | B2 * | 1/2012 | Thanu ............................ 707/607 |
| 2002/0184260 | A1 | 12/2002 | Martin et al. ................. 715/213 |
| 2003/0074339 | A1 | 4/2003 | Ye ................................... 706/16 |
| 2003/0126144 | A1 | 7/2003 | O'Halloran et al. ................ 1/1 |
| 2004/0128147 | A1 | 7/2004 | Vallinayagam et al. .......... 705/4 |
| 2004/0252136 | A1 * | 12/2004 | Bhatt et al. ....................... 345/619 |
| 2005/0102374 | A1 | 5/2005 | Moragne et al. .............. 709/217 |
| 2006/0085445 | A1 * | 4/2006 | Thanu ........................... 707/100 |
| 2007/0011211 | A1 * | 1/2007 | Reeves et al. ................. 707/203 |
| 2007/0061344 | A1 * | 3/2007 | Dickerman et al. .......... 707/100 |
| 2007/0179975 | A1 * | 8/2007 | Teh et al. ..................... 707/104.1 |
| 2007/0192278 | A1 * | 8/2007 | Anderson ......................... 707/1 |
| 2007/0203775 | A1 * | 8/2007 | Busch et al. ...................... 705/8 |
| 2008/0066052 | A1 * | 3/2008 | Wolfram ....................... 717/109 |

OTHER PUBLICATIONS

Malmstrom, J., et al.; "*Haxcel—A spreadsheet interface to Haskell written in Java*"; Department of Computer Science, Malardalen University; Mar. 30, 2004.
AccountingSoftware.com; "*NetSuite Launches SuiteAnalytics for Powerful Business Intelligence With Excel-Like Formulas*"; Jun. 27, 2007; accessed on Jul. 3, 2007 at http://www.accountingsoftware411.com/Press/PressDocView.aspx?docid=8705.

* cited by examiner

*Primary Examiner* — Doug Hutton, Jr.
*Assistant Examiner* — Soumya Dasgupta
(74) *Attorney, Agent, or Firm* — Merchant & Gould

(57) ABSTRACT

An interface for designing a report is provided, with elements of the report being disposed at intersections of report positions and configured to present information derived from data in a database. A formula is associated with one or more selected elements in the report to generate a result for the one or more selected elements. A tuple identifying the report positions of the one or more selected elements is associated and stored with the formula in a formula list associated with the report. The report is configured so that, when the report is generated, it is determined whether identifying report positions corresponding to an identified element in the report correspond with the tuple in the formula list. Upon determining the tuple corresponds with the identifying report positions for the identified element, the formula associated with the tuple is applied to generate the result.

20 Claims, 14 Drawing Sheets

METHOD FOR CAPTURING DESIGN-TIME AND RUN-TIME FORMULAS ASSOCIATED WITH A CELL

BACKGROUND

Online analytical processing and decision support provides great potential to allow users to access and manipulate enterprise data. Being able to readily access data from a relational, multidimensional, or other type of databases allows users to generate reports and make decisions based on current data.

Unfortunately, to be able to selectively access data from enterprise databases may require uses to have some skill using database query languages, such as structured query language (SQL) or Multi-Dimensional Expressions (MDX) language. Many persons that would like or need to use information stored in the databases may not have the technical expertise to create or modify database queries to retrieve desired data. These users frequently rely on pre-scripted reports that have been prepared by skilled database programmers. The users may run these reports which, in turn, present queries formulated by the programmers and present reports for which the programmers selected the data and the format.

Programming these reports may be challenging even for technically-skilled personnel. In addition, having to create, update, and modify queries in response to user requests may be very time- and labor-intensive. Furthermore, the reports resulting from these queries still may not specifically present the data the user wants it or may not present it in a way that the user desires, but many users will not have the skill to modify the queries to suit their needs.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods and computer-readable media for selectively designing and applying formulas to data accessible from a multidimensional database. More specifically, a spreadsheet interface allows for the designing and revision of formulas for elements or cells within the report that are stored in a formula list identifying the elements of cells of the report to which the formulas pertain. The formulas may be created as design-time formulas by a designer of the report and associated with the report to be accessible to users or specified users of the report. The formulas also may be created as run-time formulas by users of the report for the benefit of the user or other designated users.

An interface for designing a report is provided, with elements of the report being disposed at intersections of report positions and configured to present information derived from data stored in a database. A formula is associated with one or more selected elements in the report to generate a result for the one or more selected elements. A tuple identifying the report positions of the one or more selected elements is associated and stored with the formula in a formula list associated with the report. The report is configured so that, when the report is generated, it is determined whether identifying report positions corresponding to an identified element in the report correspond with the tuple in the formula list. Upon determining the tuple corresponds with the identifying report positions for the identified element, the formula associated with the tuple is applied to generate the result.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in three-digit reference numerals refers to the figure in which the referenced element first appears.

DETAILED DESCRIPTION OF IMPLEMENTATIONS

Figure 1:
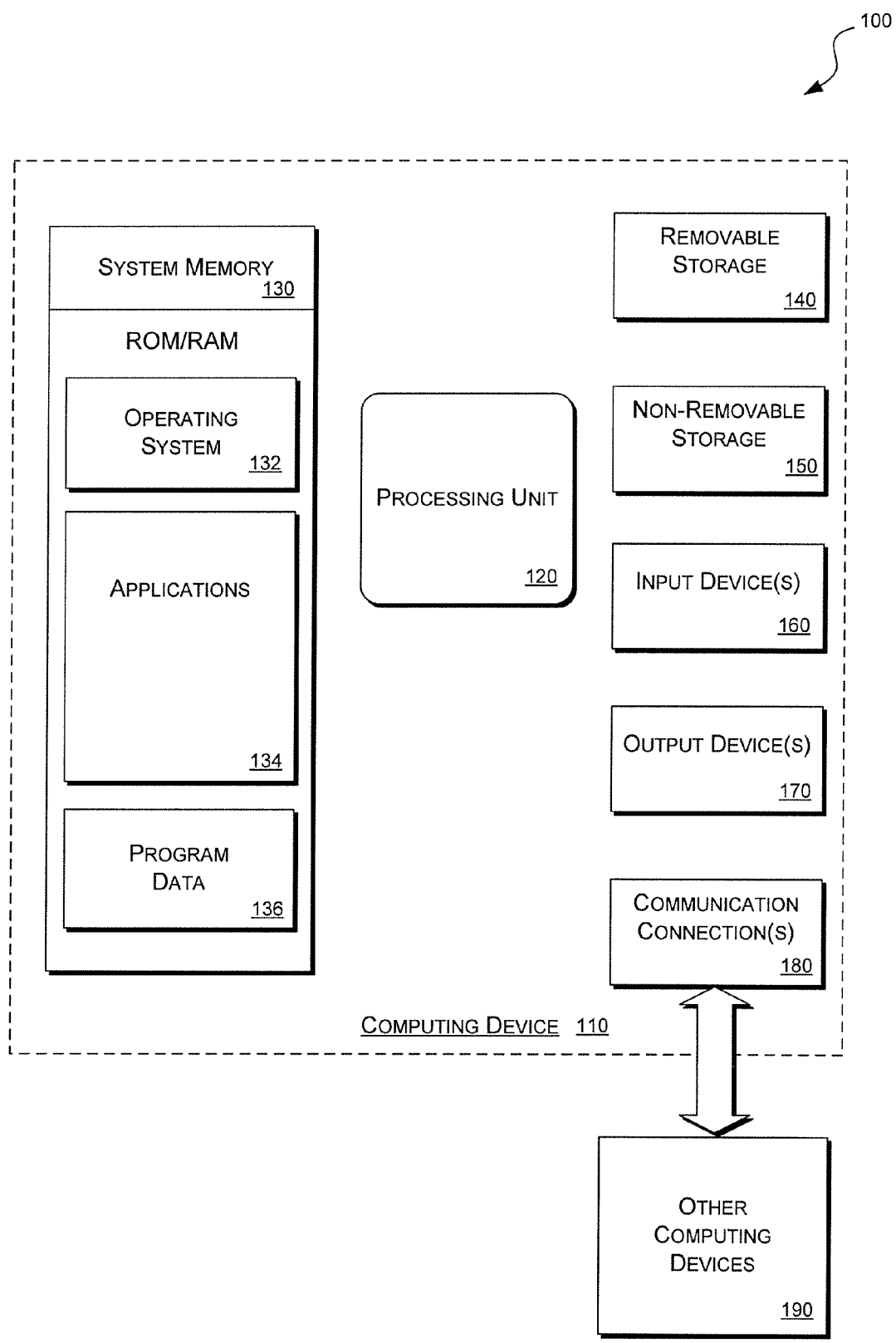
FIG. 1 is block diagram of an operating environment operable to support computer-implemented methods and use computer-readable storage media as herein described.

This detailed description describes implementations of capturing formulas, created either at design time or at run time, to be applied to a database report. In one or more implementations, the report is derived from data retrieved from a database, such as a relational or multidimensional database, according to a query and then presented in a spreadsheet format. One or more formulas then can be created in the syntax and form recognized by a spreadsheet application. The formulas created are stored in a formula list associated with the report. When the report is generated and the cells or elements of the report are populated with data, the formulas stored in the list are then applied to the report. The formulas are stored in the formula list, in one implementation, according to a tuple that identifies the coordinates of the cell(s) or element(s) to which the formulas apply.

In one implementation, the tuple identifies the coordinates of the cell(s) or element(s) by their substantive content in terms of the report positions each represents, rather than by a row or column rank. In other words, as described in an example presented below, if a cell or element represents information about a particular product available at a particular store, the tuple identifies the cell or element by the product and store identifier. As a result, regardless of whether the report is rearranged or information regarding entries is deleted from the report, formulas relevant to the content of the report will still be applied to the appropriate cells or elements in the report.

The formulas may be created either at design time, by a designer of a report, or at run time by a user of the report. In one implementation, formulas created at design time are stored in a design-time formula list that is made available to all or selected expected users of the report. Formulas created by users while using the report are stored in a run-time formula list that is preserved for the user who has created the run-time formulas and, if desired, other users. Users may selectively be given authority to create or modify formulas in the different lists. In any case, even if a user is not authorized, for example, to edit the design-time formula list, the user may create run-time formulas that modify or supersede formulas in the design-time formula list.

Implementations of the present disclosure allow for persons to design design-time or run-time formulas that will present information just as each of them would like to view the information without any of them having to use or have knowledge of database query languages. Instead, the designers and/or users can create formulas in the form and syntax recognized by the spreadsheet interface or spreadsheet applications. More persons are likely to have knowledge of and familiarity in working with spreadsheet formulas. Moreover, spreadsheet formulas may provide very rich capabilities to readily provide designers and/or users with powerful and flexible tools with which to manipulate information.

Illustrative Operating Environment

FIG. 1 depicts one possible, representative operating environment 100 that could be used to support implementations of the present disclosure. Implementations of the present disclosure could be used, for example, on a host computer or a workstation. FIG. 1 thus illustrates a general-purpose computing system representative of an operating environment that would support implementations of such systems.

Referring to FIG. 1, an exemplary operating environment 100 includes a computing device, such as computing device 110. In a basic configuration, the computing device 110 may include a stationary computing device or a mobile computing device. The computing device 110 typically includes at least one processing unit 120 and a system memory 130. Depending on the exact configuration and type of the computing device 110, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140, and the non-removable storage 10 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also include one or more input devices 160 such as a keyboard, mouse, pen, voice input device, touch input device, etc. One or more output devices 170, such as a display, speakers, printer, etc., may also be included.

The computing device 110 also includes one or more communication connections 180 that allow the device to communicate with other computing devices 190, such as over a network or a wireless network. The one or more communication connections 180 represent an example of communications media. Communications media typically embody computer readable instructions, data structures, program modules, or other data in a modulated data signal such as a carrier wave or other transport mechanism, and include any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Overview of Design and Use of Reports within an Enterprise

Figure 2:
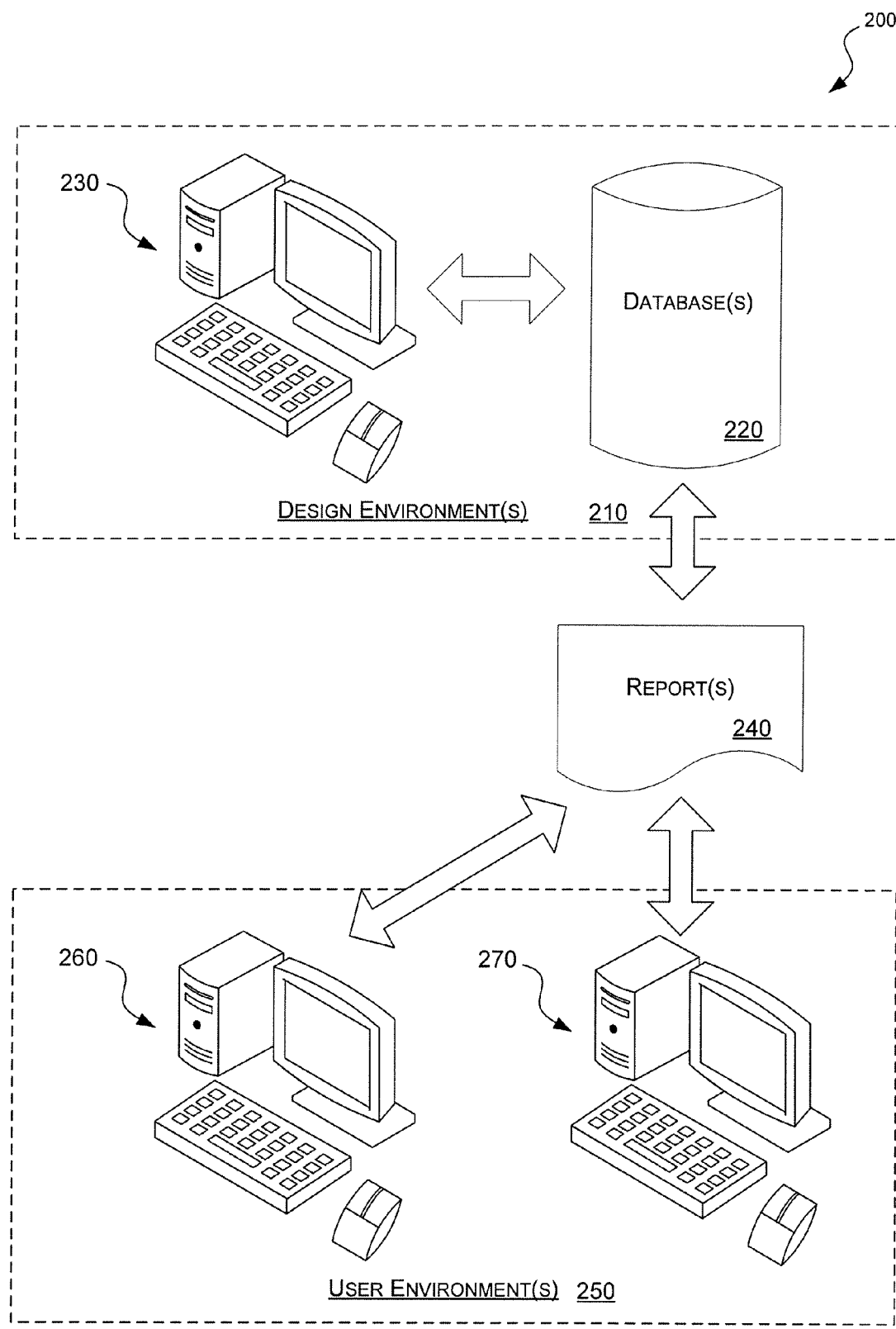
FIG. 2 is a system diagram including design and user environments in which implementations of the present disclosure may be deployed.

FIG. 2 illustrates an exemplary enterprise 200 in which implementations of the present disclosure may be deployed to facilitate design and modification of reports using implementations of the present disclosure. The enterprise 200 may include one or more design environments 210 and myriad user environments 250. For the sake of the example of FIG. 2, it is assumed that the design environment 210 encompasses one or more enterprise databases 220 and one or more workstations 230 that allow designers to work with the databases 220 to design reports 240. The reports 240 may include sophisticated queries supported by the query language or languages used to retrieve the desired data. The reports 240 also may include programming to perform operations on the data. For example, the data presented may be the result of cross-joining data elements or by performing calculations on the "raw" data actually stored in the databases 220.

In this description, the term "design" will be used generally to refer to the creation, development, authoring, modification, editing, and all similar operations concerning the application of formulas to a report. The term "design" is used consistently throughout the remainder of the document for the sake of consistency and clarity. Use of the term "design" is neither intended to nor should be taken as narrowing the range of operations with which users can interact with and apply formulas using implementations of the present disclosure.

The reports 240 may then be further designed by database programmers in the design environment or made available to user environments 250. For example, first it is assumed that the database programmers will further modify the reports 240 in the design environment 210 before releasing the reports 240 to users. According to implementations of the present disclosure, the reports 240 present retrieved data in a spreadsheet format. The designers modify the reports 240 using a spreadsheet interface accessible from the workstation 230, such as a host-based spreadsheet application or a locally-executing spreadsheet application running on the workstation 230. According to implementations of the present invention, the designers modify the report(s) 240 by creating and applying formulas to the retrieved data. The formulas therein created are stored in one or more formula lists associated with each of the reports 240 and made available to all or selected users of the reports 240 in both the design environment(s) 210 and the user environments 250. As described below, the formulas applied by the designers are considered to be "design-time formulas," because they are created while the reports are being designed for the users in the design environments 210 or the user environments 250. In some implementations, the design-time formulas are stored in design-time formula lists associated with the reports 240 with which the design-time formulas are associated.

Once the reports 240 are released to the user environments 250, whether or not the reports have been modified by the designers in the design environments 210 with design-time formulas, according to implementations of the present invention, users are presented with the reports 240 in a spreadsheet format. Again, the reports 240 are accessible from workstation 260 and 270 through a spreadsheet interface, such as that presented by a host application or as presented by a locally-executing spreadsheet application running on the workstations 260 or 270. If the reports 240 are associated with design-time formulas stored with the reports 240, the reports 240 are presented to the users with the design-time formulas applied to them.

In other words, when a user runs one or more of the reports 240, the data elements stored in the databases 220 used by the reports 240 are retrieved from the databases 220. As described operations supported by the database query languages may also be applied to the retrieved data. The data is then presented in a spreadsheet format in the reports 240, providing the user with current data presented in a report format created by the report designers.

Once a user has run one of the reports, implementations of the present disclosure allow the user to further modify the report analogously to how the designers were permitted to modify the reports. Using the spreadsheet interface presented by a host-based or locally-executing program, the user can create and apply formulas to the report to modify or customize the data for his or her own use or that of others. These formulas, which may considered "run-time formulas" because they are created by those who run the reports, may be stored in a formula list. The formulas may be stored in the same list as design-time formulas created by designers or stored in separate run-time formula lists. The run-time formulas may be made available to the designers of the reports 240 or other users.

By having formulas stored in design-time and/or run-time formula lists, these formulas can then be applied to modify the reports 240 each time the reports 240 are run. Designers can take advantage of the functionality that may be offered by spreadsheet programs to create formulas in generating the reports 240 for the users without having to try to effect the same results using what might be more complicated or less efficient ways using database-level tools. Nonetheless, the formulas created by the designers are applied the reports 240 presented to the users just as though the formulas had been created at the query-level. To take another example, a user that wishes to modify a particular report for his or her own use can create formulas to modify data presented in one of the reports 240. The same formulas then can be applied to the reports 240 each time the user access those reports 240 to provide the same customized reports to the user each time. Moreover, any time users wish to customize and/or modify formulas to modify reports, they can do so without having to invest the time, cost, and delay involved in engaging a database programmer to made those changes.

Example of Formulas Applied to a Report

Figure 3:
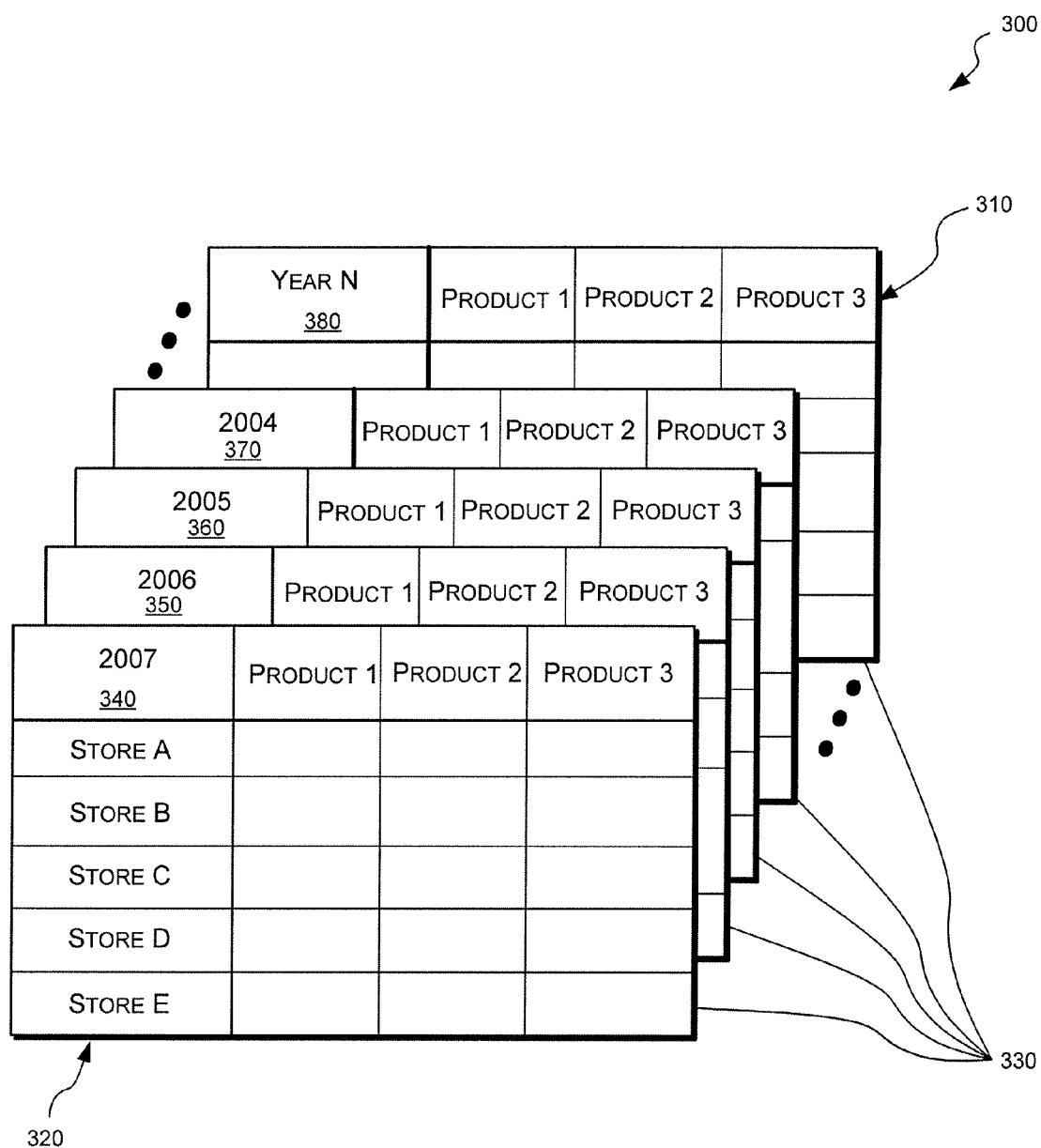
FIG. 3 is a block diagram of a sample multidimensional database represented as a plurality of related data tables.

FIG. 3 depicts a sample multidimensional database used to illustrate how implementations of the present disclosure may be used to apply formulas to reports. FIGS. 4-9 are report views to illustrate the application of formulas according to implementations of the present disclosure and their affect on the reports. The database 300 is a three-dimensional database including entries for a number of products 310 for each of a number of stores 320 over a number of years 330. In the database 300 of FIG. 3, the products 310 are presented on an x-axis or horizontal axis, the stores 320 are presented on a y-axis or vertical axis 320. The years 330, which in FIG. 3 include years from 2007 back through Year N, and are presented as a number of slices 340-380 within a depth of the database 300, which can be conceived as arranged along an orthogonal z-axis. Certainly, such a database as database could have innumerably more dimensions; however, a database having three dimensions is described for the sake of visual simplicity and clarity.

Figure 4:
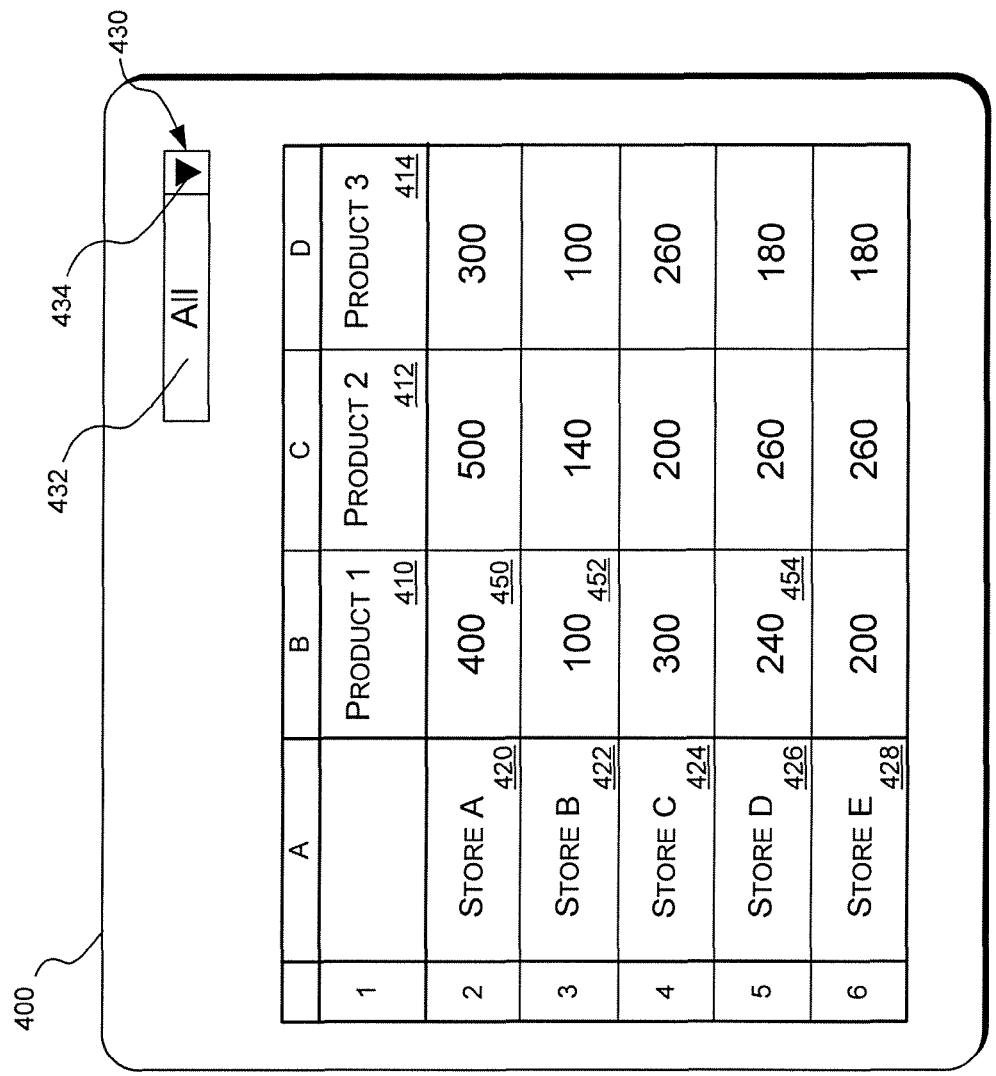
FIG. 4 is a screen view of a sample report derived from a query applied to a database presented in a spreadsheet interface.

FIG. 4 is a screen view of a sample report 400 derived from a query applied to a database. The report 400 may be extracted from a database, such as database 220 (FIG. 2) as the result of a SQL, MDX, or other type of query applied to the database 220. The report is presented in a spreadsheet format. Database management systems, such as Microsoft Office PerformancePoint® distributed by Microsoft Corporation of Redmond, Wash., allow for queries to be presented to a database to generate reports that are viewable using a spreadsheet application, such as Microsoft Office Excel®.

For purposes of this example, it is assumed that the report 400 is extracted from the multidimensional database 300 of FIG. 3. The report 400 lists, for the sake of example, the value of products that have been sold in a number of stores, including Product 1 410, Product 2 412, and Product 3 414, for each of a number of stores including Store A 420, Store B 422, Store C 424, Store D 426, and Store E 428. The period for which the value is shown is determined by a user a making a selection from pull-down menu bar 430. In the report 400, the user has made the selection of "All" periods 432, such as by selecting the pull-down button 434 and making a selection from the resulting list (not shown), which is familiar to users of graphical user interface software. The resulting values that appear include the value "400" appearing in an element or cell 450 that stores a value for Product 1 410 at Store A 420, the value "100" appearing in an element or cell 452 that stores a value for Product 1 410 at Store B 422, and the value "240" appearing in an element or cell 454 that stores a value for Product 1 410 at Store D 426, along with other values for other products and/or at other stores.

For purposes of this example, the values reflecting the value of products sold presented in the report does not take into account promotional prices or discounts, and those using the report 400 would like to be able to adjust the values for the products and/or for the stores. For example, Product 1 410 may be sold in connection with Product 2 412 such that the value of Product 1 410 may be a function of the value of Product 2, and a designer or user may want to adjust the value that is presented for Product 1 410 for Store A through Store E 420-428. According to implementations of the present disclosure, such adjustments may be made by applying formulas to the report data using the spreadsheet interface and then associating those formulas with the report. As a result, each time the report 400 is run to retrieve current data, the previously-created formulas may again be applied to the data, allowing the user to receive a current report customized using the formulas previously created and stored with the report. According to implementations of the present disclosure, the formulas are associated with the report so that they may be shared with multiple users. Also, the formulas may be created and associated with the reports by using the spreadsheet interface without having to involve a database programmer to change the report or any queries at the database level.

Figure 5:
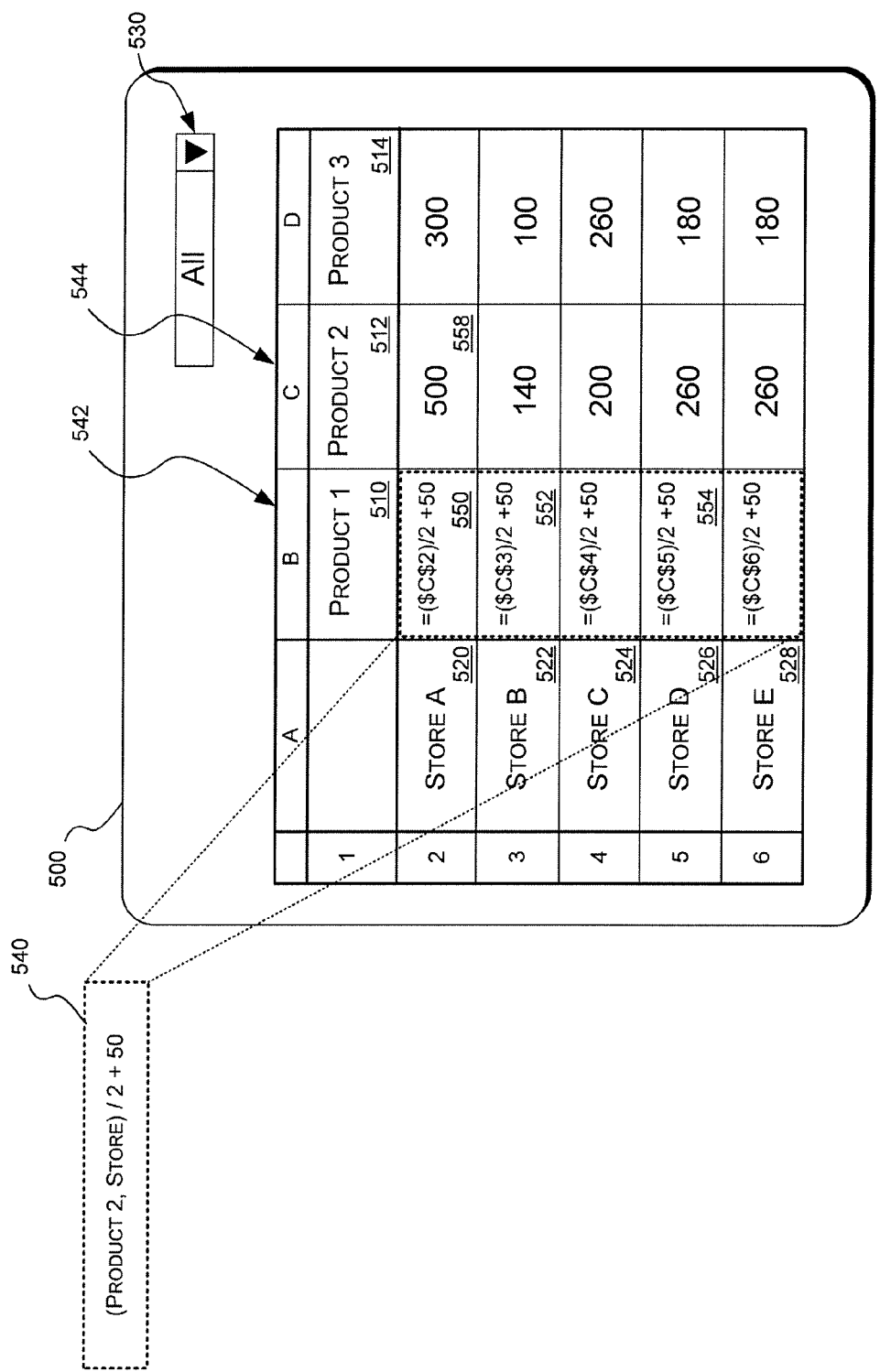
FIG. 5 is a screen view of the sample report of FIG. 4 to which a formula is applied to a number of elements or cells according to an implementation of the present disclosure.

FIG. 5 is a screen view of a report 500 which is the same as the report 400 (FIG. 4) but modified by the application of a formula 540. The report 500 presents values for Product 1 through Product 3 510-514 for each of Store A through Store E 520-528 for the selected period "All" 530 as modified by the formula 540, which has been applied to elements or cells for Product 1 510 for all stores including Store A through Store E 520-528. The formula 540, presented in terms of its substantive content, is given by Eq. (1):

$$(\text{Product 2, Store})/2)+50 \tag{1}$$

Thus, the value presented for Product 1 510 for each of Store A through Store E 520-528 is replaced with half the value of Product 2 512 for that same store plus 50. The term "Store" in the formula 540 of Eq. (1) without an indication of a specific store, according to an example of an implementation of the present disclosure, is delimited to reference the Product 2 512 value for the store in the row to which the formula 540 is applied.

Within the report 500, the formula 540 is presented in the syntax and form of a spreadsheet application, such as Microsoft Office Excel®, in column B 542 of the report 500. As a result of the application of the formula 540 of Eq. (1), in an element or cell 550 representing Product 1 510 at Store A 520, the spreadsheet equation "=($C$2)/2+50," is presented. This formula equation indicates that the result presented in the element 550 will be the value in the next column in the same row, represented by "($C$2)," divided by 2, plus 50. Similarly, the result presented in element 552 will be the value in the next column in the same row, represented by "($C$3)," divided by 2, plus 50, and the value presented in element 554 will be the value in the next column in the same row, represented by "($C$5)," divided by 2, plus 50.

Figure 6:
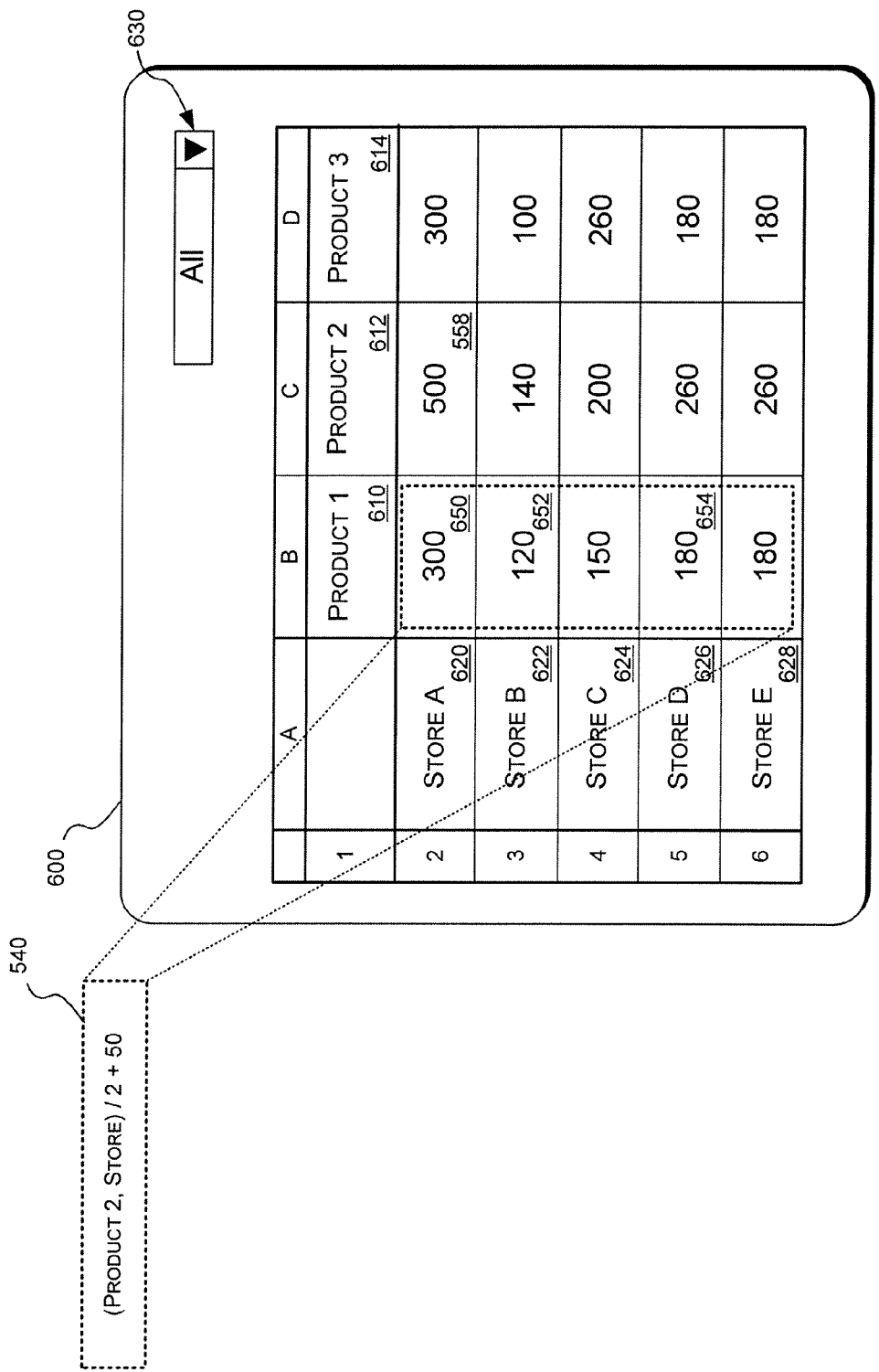
FIG. 6 is a screen view of the sample report of FIG. 4 showing results of the formulas applied in FIG. 5.

The syntax of the formula 540 and the spreadsheet formulas presented in cells 550, 552, and 554 of FIG. 5, only present examples of how the formulas are presented. It may be convenient for spreadsheet users to be able to formulate equations and formulas using the familiar spreadsheet syntax. On the other hand, it may be easier for users to use the substantive formulation given by formula 540 of Eq. (1) to state the formula in terms of its content. In any case, implementations of the present disclosure are not limited to any particular formula syntax FIG. 6 shows a report 600 in which the results of the formulas of FIG. 5 are presented. In the element or cell 650 representing the value for Product 2 612 at Store A 620 is "300," which is half of the value for Product 2 612 (listed in the next column of the same row) plus 50. Correspondingly, an element or cell 652 representing Product 1 610 at Store B 622 presents the modified value "120" and an element or cell 654 representing Product 1 610 at Store D 626 presents the modified value "180," with these modified values also being one-half of the value of Product 2 for the same store (each being the value in the next column of the same row) plus 50.

The formula 540 of Eq. (1) takes the values in the elements or cells specified in the formula 540 and inserts the values in the elements or cells to which the formula is applied. Thus, the value presented for Product 1 510 for each of Store A through Store E 520-528 is replaced with half the value of Product 2 512 for that same store plus 50. The term "Store" in the formula 540 of Eq. (1) without an indication of a specific store, according to an example of an implementation of the present disclosure, is delimited to reference the Product 2 512 value for the store in the row to which the formula 540 is applied.

Users of reports that were presented in a spreadsheet format may have had the ability to apply formulas to the reports to customize the report using the currently-retrieved data. However, if a user were to later re-run the report to retrieve then-current data, that report would not include the changes made by the user in applying the formulas to the previous report. In terms of the current example, if a user applied the formula 540 to the report 500, but then re-ran the report later to obtain current values, the results yielded by the application of the formula 540 to report 500 would be lost. The user could go through the steps of applying the formulas to the new report data, although that would involve reinvesting that same effort each time the report was run.

Figure 7:
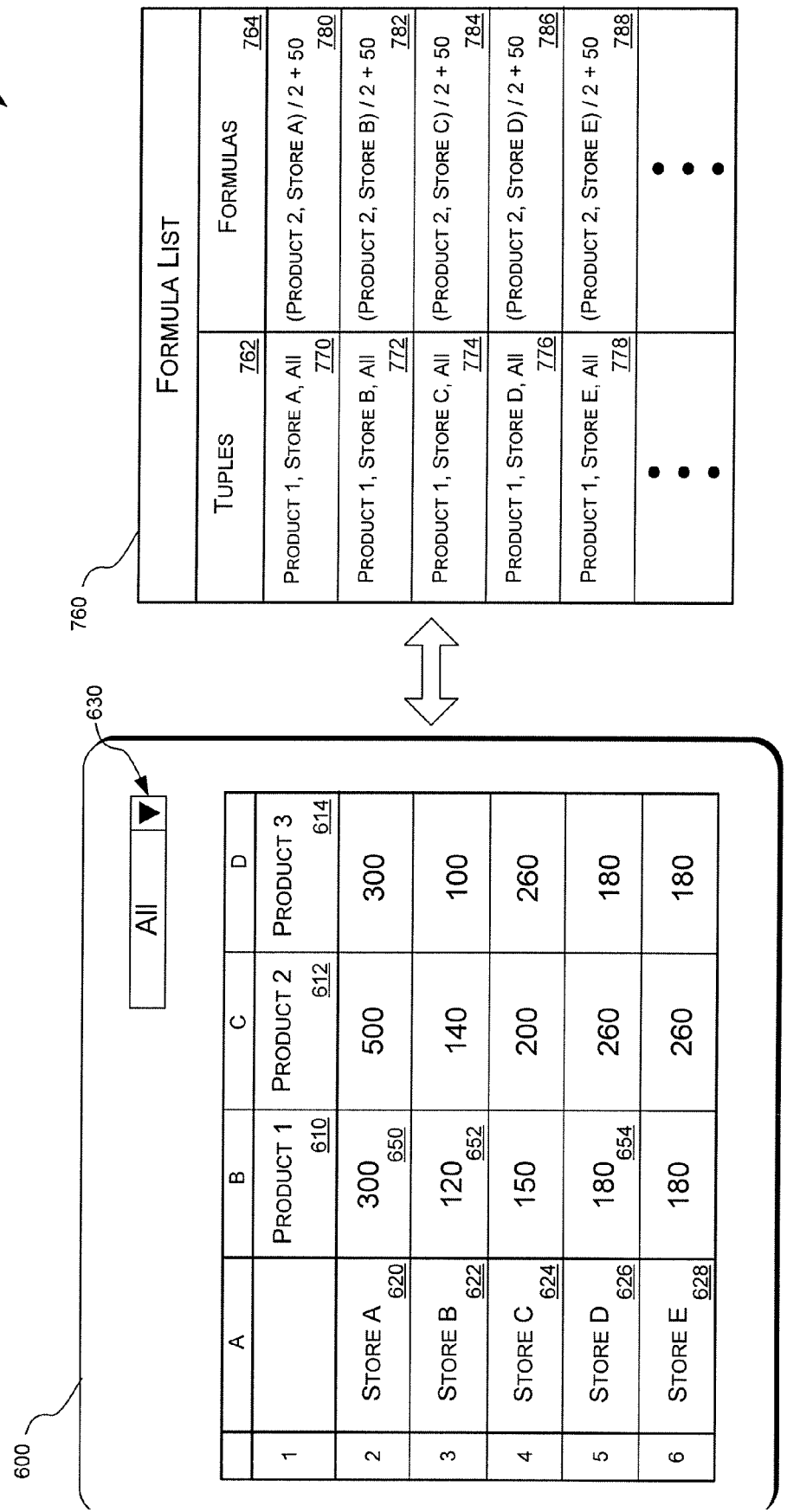
FIGS. 7-9 are screen views of the modified sample report of FIG. 6 and formula lists according to implementations of the present disclosure.

As shown in FIG. 7, however, implementations of the present disclosure allow for such formulas to be saved in a formula list associated with a report so that, as the report is later re-run and populated with potentially new data, the same formulas may be applied. As a result, the user, and anyone else with whom this version of the report is shared, will be able to view the customized report without having to recreate and reapply the formulas to do so.

FIG. 7 shows a combined report including the report 600 (FIG. 6) and an associated formula list 760 in which formulas, like the formula 540 applied in FIG. 5, are associated with a report. In one implementation of the present disclosure, the formula list 760 is included in the combined report 700 as metadata associated with the report 600.

The formula list 760, according to an implementation of the present disclosure, includes two types of entries: one or more tuples 762 and one or more corresponding formulas 764. Each of the listed tuples 762 identifies the elements or cells in the report 700 with which a corresponding formula is to be applied. Formulas 764 corresponding with each of the tuples 762 are listed in correspondence with the tuples 762. Thus, as further explained below, once the associated report 600 is populated, one or more formula lists 760 associated with the report 600 are checked to determine if the report includes one or more tuples 762 in the formula list 760. According to implementations of the present disclosure, a report-rendering system may include a filter or similar system that parses the tuples and the report to determine which formulas, if any, stored in the formula list 760 should be applied to the report. If elements or cells in the report 700 are identified by a tuple found among the tuples 762 listed in the formula list, the corresponding formula or formulas 764 are applied to the elements or cells in the report identified by the matching tuple 762.

According to one implementation of the present disclosure, the tuples 762 are stated in terms of report positions by the specified content of the report positions, rather than a rank by row, column, or other physical position of the element or cell in the report at the time the formula is created. As a result, the formulas 764 in the formula list 760 are applied to elements or cells in the report 700 that substantively correspond with the formula indicated by the corresponding tuples 762. Thus, for example, if a report is changed to add, delete, or move rows, columns, or other dimensions, the formulas 764 will not be incorrectly applied to whatever row number, column number, or other positions with which the formula 764 was previously associated. Instead, it will be determined if and where the report 600 includes elements or cells whose content, as reflected in one of the corresponding tuples 762, are that for which one of the formulas 764 was designed. If so, a formula associated with the element or cell is then applied to the substantively appropriate elements or cells.

Alternatively, however, and as described below with reference to FIGS. 8 and 9, according to another implementation of the present disclosure, the tuples also could be specified in terms of the report dimensions using column, row, and other designations. Further alternatively, both the tuples and the formulas may be specified in terms of report dimensions, e.g., using spreadsheet coordinates to define the tuples and the formulas. Still further alternatively, implementations of the present disclosure may specify the tuples in one form while the formulas are specified in another. For example, the tuples may be specified in terms of the specified content of the elements or cells, while the formulas are specified in a spreadsheet format according to report dimensions, or the tuples may be specified in terms of the spreadsheet format while the formulas are specified according to the content of the elements.

Furthermore, as also described below, the formula list may include tuples that each specify an individual element or cell and a formula applicable to that specified cell. Alternatively, tuples in the formula list may each specify multiple elements or cells, or a range of elements or cells, with the tuple being associated with a formula designed to apply to each of those multiple specified elements or cells. Implementations of the present disclosure are not limited according to any particular choice as to how either the tuples or the formulas are specified.

Regardless of how the tuples and formulas are specified or listed in the formula list, because the formulas are stored in the formula list and not just entered into the report, when the associated report is re-run and populated with current or different data, the formulas will again be applied to the appropriate cells. Thus, users of the report can design and revise formulas that will be applied to the report each time it is run without having to recreate and/or reapply desired formulas each time the report is generated.

Referring back to the example of FIGS. 4-7, the original report 400 is run to populate and present the report 400. As shown in FIG. 5, the formula 540 is applied to the report 400 to yield the values presented in the modified report 600. However, instead of the formula 540 only being applied to this current presentation of the modified report 600, the formula 540 is stored among the formulas 764 in the formula list 760 and associated with the tuples 762 that identify to what elements or cells each of the formulas applies.

In the implementation illustrated in FIG. 7, for each of the elements or cells to which the formula 540 applies, the formula list includes a tuple/formula pair for each of those elements or cells. In the formula list 760 for the element or cell 650, the tuple 770 to identify the report position to which its associated formula entry 780 is applied is given by Eq. (2):

$$\text{Product 1, Store } A, \text{All} \tag{2}$$

The tuple 770 specifies that the element or cell 650 for Product 1 610 and Store A 620, and for all periods, which is presented at the intersection of entries for Product 1 610 and Store A 620 for all periods in the report 600, has an associated formula 780. The formula 780 associated with the tuple 770 is also specified in terms of the content of the report and is given by Eq. (3):

$$(\text{Product 2, Store } A)/2+50 \tag{3}$$

The formula 780 of Eq. (3) is similar to the formula 540 of Eq. (1), except that the formula 780 of Eq. (3) is specified to refer to Store A 620, the specific store whose value is used in generating the value in the element or cell 650. Similarly, in each of the other tuples 772-778, the stores 622-628 identifying the elements or cells to which the associated formulas 782-788, respectively, are applied are specified, and the stores 622-628 on which each of formulas 782-788 depend for values also are specifically identified. Because the period chosen in the report 700 was "All" periods 730, the applicable period in the tuple 774 also is set to the delimiter "All."

According to implementations of the present disclosure, when a formula is applied to a parent cell or group of cells, such as "All" periods 630, the formula is applied to the children of that cell or group of cells, as well. On the other hand, if a user had selected a specific period, such as the year 2006, when applying the formula, the formula would not be applied to other periods, such as the years 2005 or 2007. According to implementations of the present disclosure, selection of "All" periods is a delimited selection, just as selecting a whole row of all products 610-614 or a whole row of all stores 620-628 is a delimited selection.

As a result, any time the report is run, it will be determined whether the report 600 includes elements or cells for which a matching tuple is included in the tuples 762 of the formula list 760. If so, in that specified element, the associated formula in the formulas 764 will be applied to the specified element or cell using the values references in the formula. In implementations in which the tuple is defined in terms of the content of the elements or cells, the associated formula will be applied to appropriate elements or cells even if other rows, columns, or other dimensions have been added, deleted, or repositioned.

As previously described, formulas can be created and applied to reports by report designers; similarly, formulas can be created and applied to reports by report users or groups of users. A designer may employ implementations of the present disclosure to modify a report for all users. As previously mentioned, because of the richness in formula design that may be available in a spreadsheet interface or spreadsheet application, formulas may be designed that could not be created or could not be created as efficiently using database query languages. Alternatively, a designer, or other person who is not knowledgeable in those database languages may want to tailor a report for the enterprise or a portion of the enterprise; such a person can do so using implementations of the present disclosure.

On the other hand, regardless of whether formulas are created by report designers other users of a report may wish to customize a report for their own uses, including ad hoc or "what if" types of query. Both designers and users may create formulas that modify either the retrieved data in the report or values that appear as the result of other formulas applied to the report. Through what may be a familiar or at least more accessible tool in the form of a spreadsheet interface or application, designers and/or users can customize or manipulate a report at the spreadsheet level without involving database programmers or report designers. Implementations of the present disclosure allow designers and/or users to apply formulas to the same report and save those formulas in a formula list for later use.

According to implementations of the present disclosure, the formulas stored in the formula list 760 may be designed or edited in various ways. For example, the formulas may be designed by manipulating the report presented in the spreadsheet interface or application, just as users typically manipulate formulas within spreadsheets, and then automatically stored in the formula list 760. The user also may be given an option as to whether a formula applied to the report 600 should be stored in the formula list 760. Hypothetically, a user performing what if type analysis may not want to preserve the formulas he or she is using or, if the user has made a mistake in creating a formula, the user may wish to discard the formula. Alternatively, the user may be presented with an option to access the formula list 760 directly, in a form comparable to the way the formula list is presented in FIG. 7, to be able to edit the text of the tuples 762 and formulas 764.

Figure 8:
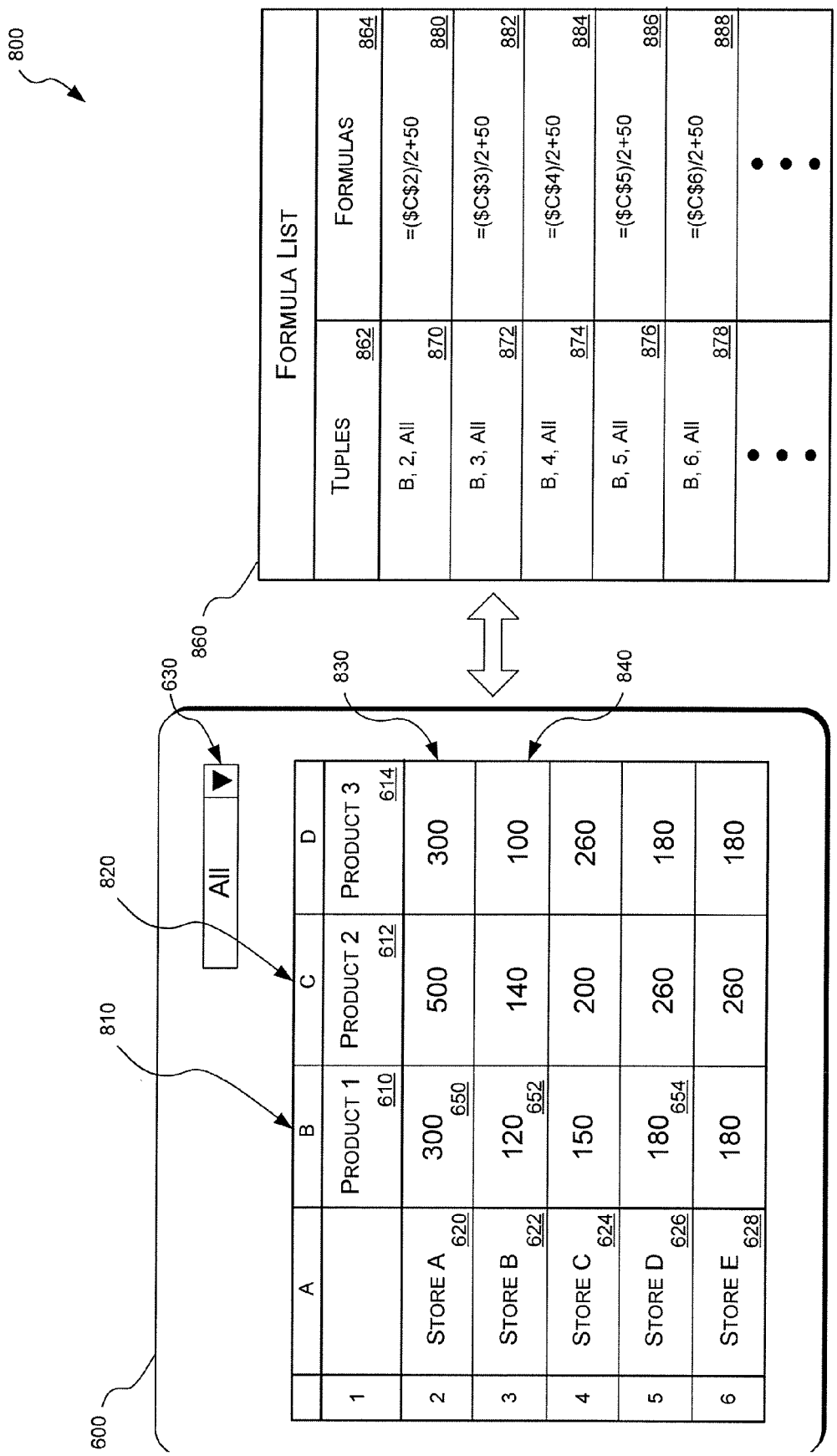
Figure 9:
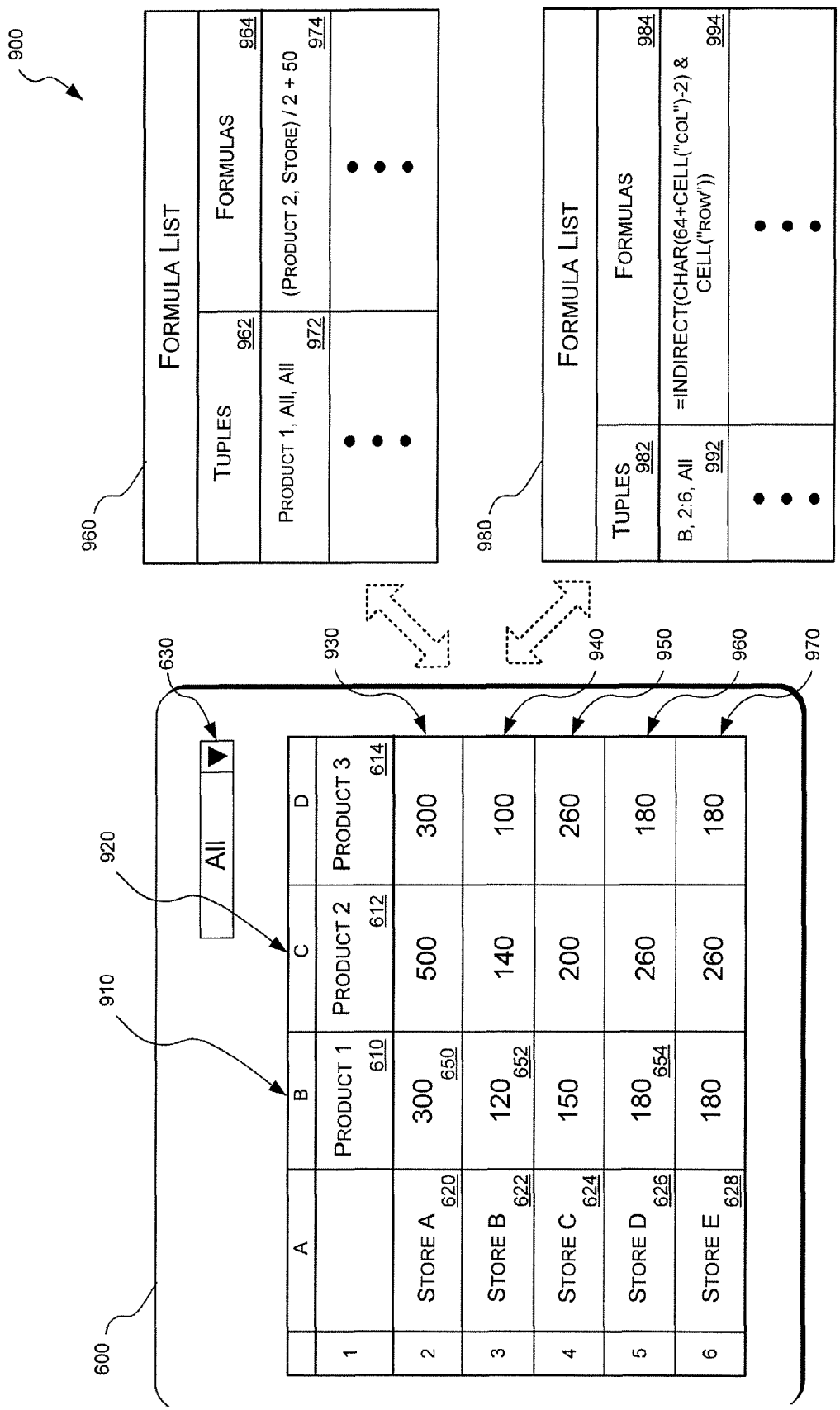

The formulas stored in formula lists also may be stored in a number of different forms, as shown in FIGS. 8 and 9. FIG. 8 presents a screen view of the report 600 and a formula list 860 in which formulas representing the formula 540 is stored individually for each of the cells to which the formula 540 is applied. Even if the formula is created for one element or cell and then copied to a number of other cells, as understood by users of spreadsheet applications, the formula may nonetheless be stored individually for each of the elements or cells to which the formula is applied.

Like the tuple 772 (FIG. 7), the tuples 862 in the formula list include tuples 870-878 that identify the elements or cells in terms of their substantive content. For example, the tuple 870 expressly identifies the element or cell for Product 1 at Store A (for all periods) as "Product 1, Store A, All." Similarly, the tuple 872 expressly identifies the element or cell for Product 1 at Store A (for all periods) as "Product 1, Store B, All," and the tuple 876 identifies the element for cell for Product 1 at Store D (for all periods) as "Product 1, Store D, All."

Consistent with the use of the familiar spreadsheet interface, the formulas 864 in the formula list 860 include formulas 880-888 specified in spreadsheet syntax, such as that used by Microsoft Office Excel®. For example, for the element or cell 650 in column B 810 and row 2 830 identified by the tuple 870 "Product 1, Store A, All" for the formula 540 of Eq. (1) "(Product 2, Store)/2+50" references the value of Product 2 612 in column C 820 for Store A 620 in row 2 830. Thus, the spreadsheet formula associated with element or cell 650, that includes operands for Product 2 612 in column C 820 and for Store A 620 in row 2 830 is given by Eq. (4):

$$=(\$C\$2)/2+50 \qquad (4)$$

Correspondingly, the element or cell 652, presented one row below element or cell 650, references the value of Product 2 612 in column C 820 and for Store B 622 in row 3 840 with a formula given by Eq. (5):

$$=(\$C\$3)/2+50 \qquad (5)$$

Thus, in one implementation of the present disclosure, even a formula that was collectively applied to a number of elements or cells may be stored individually in the formula list 860 stored associated and/or stored with a report 600.

FIG. 9 shows a combined report 900 showing the report 600 with different forms of associated formula lists 960 and 980 including tuples that apply to multiple cells and formulas specified so as to operate on the appropriate data when inserted in a range of cells. The formula lists 960 and 980 include different formats in which to present tuples 962 and 982 and formulas 964 and 984.

As previously described, it may be beneficial to specify the tuples according to the content of the elements where the results of the formula are presented, e.g., Product 1, Store A, etc., and to specify the formula in terms of the content on which it operates. Specifying tuples and/or formulas in such a form allows for the tuples and/or formulas to be applied in reports even when dimensions are added, deleted, or moved so that, for example, a column that previously stored entries for Product 1 in column B, will still be applicable even if the entries for Product 1 were moved to column C or column Q of a report.

To that end, in formula list 960, the tuples 962 and the formulas 974 are expressed in terms of the substantive content to which each refers. For example, for the application of the formula 540 (FIG. 5), the tuple 972 is given by Eq. (6):

$$\text{Product 1,All,All} \qquad (6)$$

The tuple of Eq. (6) thus specifies that the associated formula 974 will apply to cells in the Product 1 column 910, for any of the stores from Store A-Store E 620-628 and for any period. The formula 974 is the same as that given in Eq. (1). The formula 974 applies to the cells indicated by the tuple 972 and operates on the value for Product 2 at the same store for which the formula 974 is applied.

Alternatively, however, the tuples may be presented according to the dimensions of the report, as also shown in FIG. 9 in the formula list 980. In a spreadsheet application, such as Microsoft Office Excel®, an "indirect formula," "named range" formula, or a similar device allows for a formula to be specified in such a way that the formula is portable. For example, using a "named range" formula, the formula will reference data in a specified part of the spreadsheet, regardless of what element or cell references the data. For another example, in relative using an "indirect formula," cells are designated by their position relative to the element or cell in which the formula appears. In either case, the formula may be specified independent of column or row variables, such as "$C$2" used in the formula 880 of FIG. 8, allowing one formula to be applied to multiple different cells.

In the formula list 980 of FIG. 9, the same formula 540 (FIG. 5) was applied to elements or cells in column B 910 for each of rows 2-6 620-628 representing Store A-Store E 620-628, respectively. The "same formula" applied was that the value listed for each of the stores Store A-Store E 620-628 for Product 1 610 is the value for Product 2 612 for the same store. Using an indirect formula, a single definition of the formula 994 can be written to apply to each of the range of elements or cells in which it applies, as given by Eq. (7):

$$=\text{INDIRECT(CHAR(64+CELL("col")-2)\&CELL("row"))} \qquad (7)$$

The formula 994 of Eq. (6) will invoke data from cells in the same row in the next column, regardless of the column or row designation. As a result, the formula 994 of Eq. (7) may be applied using a tuple 992 that specifies a range of elements or cells given by Eq. (8):

$$B,2:6,\text{All} \qquad (8)$$

In the report 600, the tuple 992 of Eq. (8) specifies that the formula 994 applies to elements or cells in column B 910, for each of rows 2-6 930-970, for all of the delimited, unspecified periods ("All"). Thus, according to implementations of the present disclosure, a formula defined so as to provide a correct result for each of the elements or cells in the range may be applied to multiple elements or cells using a tuple specifying the range of elements or cells in the range.

Figure 10:
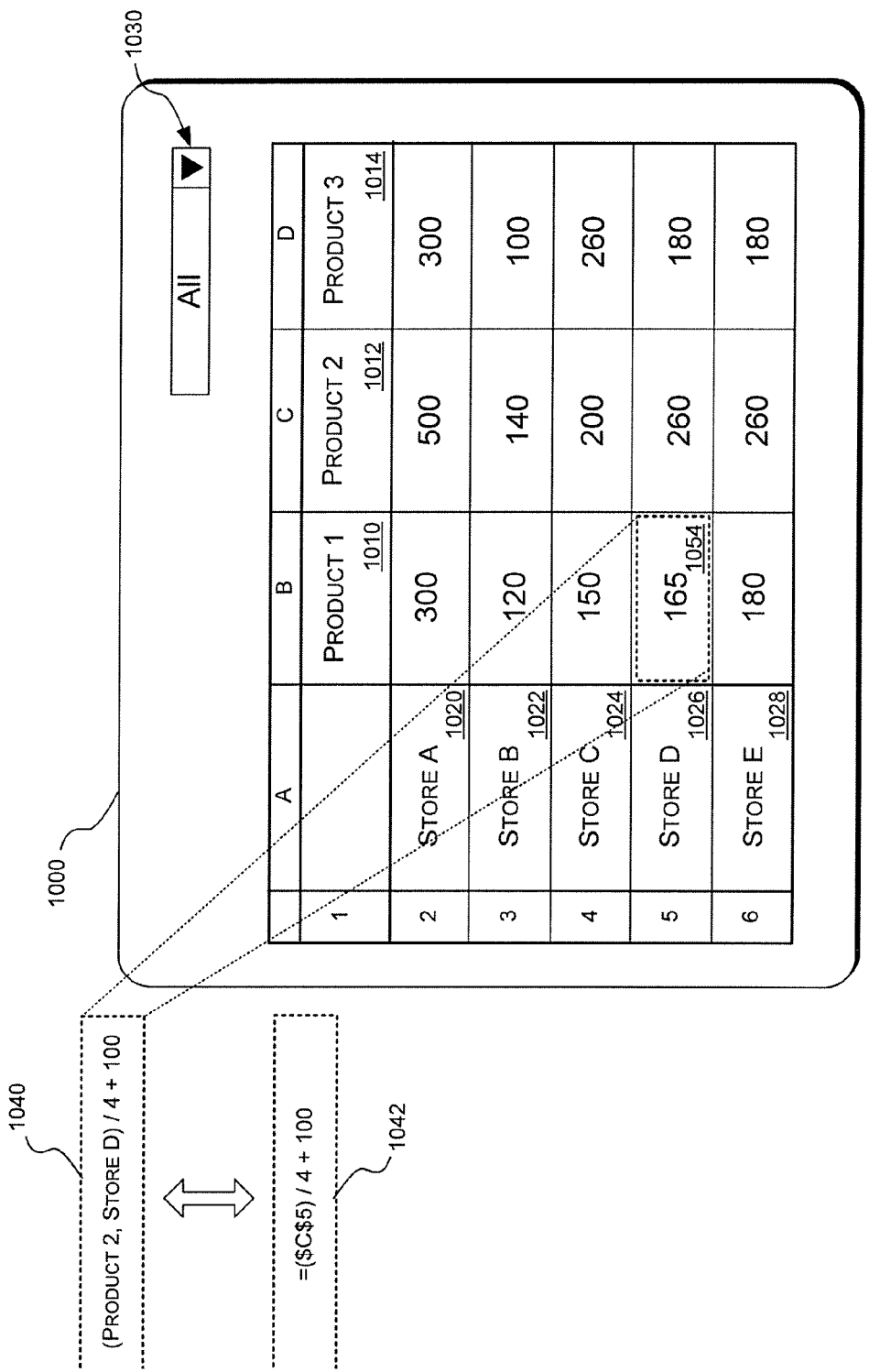
FIG. 10 is a screen view of the sample report of FIG. 6 to which another formula is applied according to an implementation of the present disclosure.

FIG. 10 presents a screen view of a report 1000 that is modified by the application of another formula 1040. Specifically, the report 1000 includes the report 600 of FIG. 6, which included the report 400 (FIG. 4) as run against the database to collect the specified values for Product 1 1010 through Product 3 1014 at Store A through Store E 1020-1028. The report 400 was modified by the application of the formula 540 to generate the modified report 500 of FIG. 5 and the values presented in the report 600 of FIG. 6. The report 1000 is further modified by the application of the formula 1040 to a single element or cell 1054 representing the value for Product 1 1010 at Store D 1026. The formula 1040 is given by Eq. (9):

(Product 2,Store $D$)/4+100 (9)

In the syntax of the spreadsheet, the formula 1042 is given by Eq. (10):

($C$5)/4+100 (10)

The formula 1042 of Eq. (10) is applied to yield the actual value presented in the cell 1054. The previously-presented value in the element or cell 654 representing Product 1 610 (FIG. 6) at Store D 626 was "180," which was yielded by the formula 540. Applying the formula 1042 of Eq. (10) (which is functionally the same as the formula 1040 of Eq. (9)) yields a result of "165," which is shown in cell 1054. As noted, the formula 1040 of Eq. (9) is applied only to the cell 1054. However, because the period selected is "All" 1030, the formula 1040 or 1042 is applied to the cell 1054 for all periods.

It should be noted that the formula 1040 may have been created and applied by the same person or group that created the formula 540 (FIG. 5) that was previously applied to the original report 400 (FIG. 4). Both of these formulas 540 and 1040 may have been created by the designers of the report 1000 and would be considered design-time formulas. These formulas may be associated with the report 1000 for all users or for selected groups of users. On the other hand, both formulas 540 and 1040 may have been created by users and would then be considered run-time formulas. These formulas then would be associated with the report 1000 only for use by the user who created the formulas 540 and 1040 and/or for use by other specified users. Further alternatively, one of the formulas, such as formula 540 or 1040, may have been created by designers, while the other formula, formula 1040 or 540, may have been created by a user. Whether created by designers or users, formulas may be applied in generating the report 1000.

Figure 11:
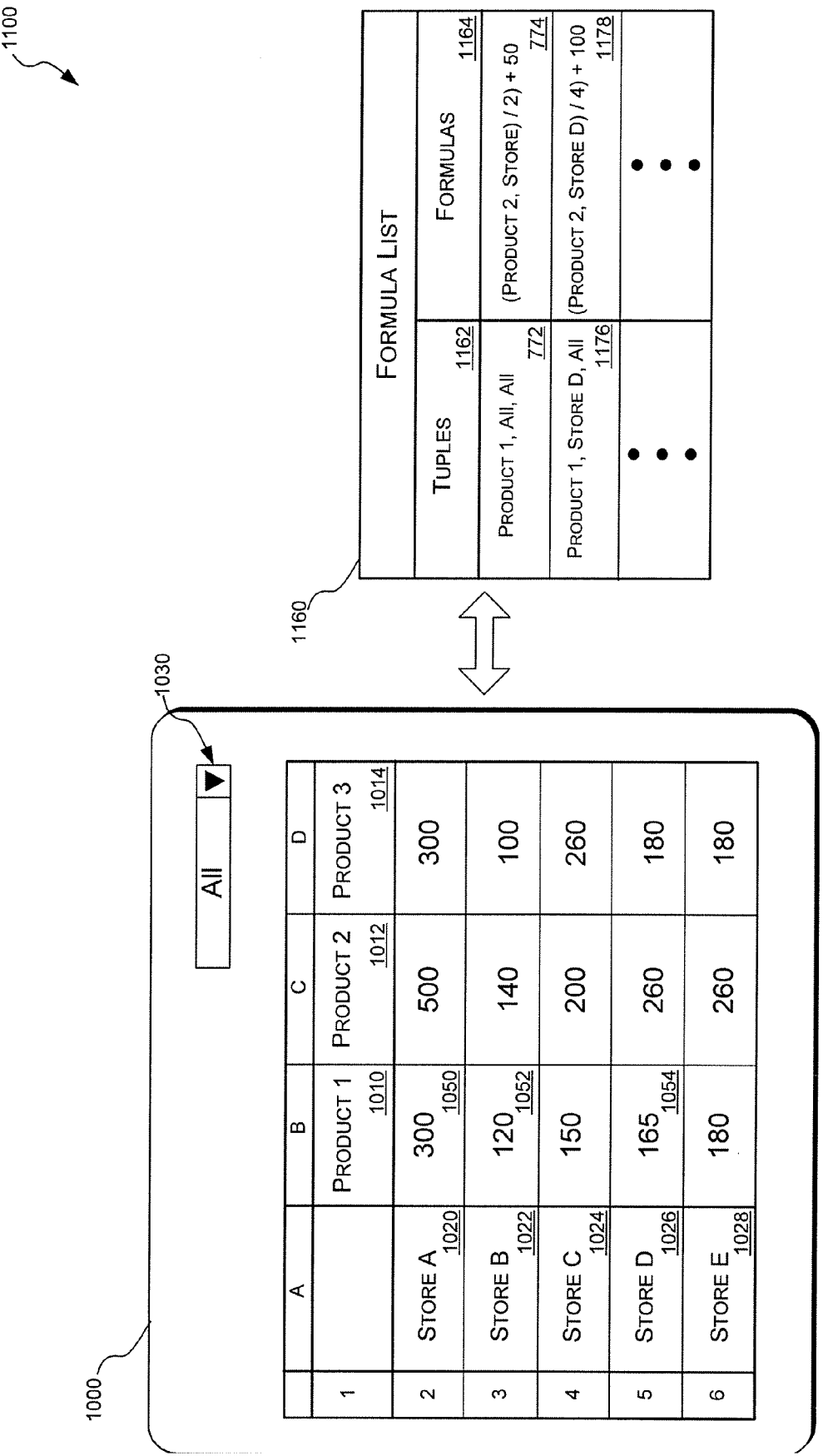
FIG. 11 is a screen view of the modified sample report of FIG. 10 and an updated formula list according to an implementation of the present disclosure

FIG. 11 shows a combined report 1100 showing the report 1000 and its associated formula list 1160. The formula list 1160 shows a collective tuple 772 and a collective formula 774 that are applicable to multiple cells. However, although not specifically shown in FIGS. 11 and 12, the formula list 1160 may be populated with tuples and formulas adapted to apply to individual cells. Implementations of the present disclosure are not limited to any particular expression of the tuples and cells.

The formula list 1160 is updated to include the formula 1040 of Eq. (9) applied to the report 1000. The formula list 1160 already includes the tuple 772 and the formula 774, which was described with reference to FIGS. 6 and 7. The formula list 1160 is updated to include the formula 1040 to the formulas 1164 in the formula list 1160 as formula 1178. The formula 1178 is associated with a tuple 1176 that specifies the element or cell 1054 to which the formula 1178 has been applied.

The tuple 1176 specifies the element or cell 1054 to which the formula 1178 in the formula list 1170 is applied. The tuple 1176 is given by Eq. (11):

Product 1,Store,All (11)

The tuple 1176, as in the case of the tuple 772, specifies the element or cell to which the formula is to be applied in terms of the content of the element or cell represents instead of the row, column, or other type of physical coordinates or ranks. Using these substantive report positions, as previously described, allows for the formula 1178 to be appropriately applied in the report 1000 even if rows, columns, or other dimensions are added, removed, or rearranged. The tuple 1176 represents the element or cell 1054 by specifying it is the element representing the information for Product 1 1010 at its corresponding store, Store D 1026. Also, with the delimiter "All" the formula applies to all periods because, according to one implementation of the present disclosure, the selected period 1030 is all in the report, thus, the formula 1178 is applied to all periods and their children.

Two aspects of the example of FIG. 11 should be noted. First, there are now two formulas in the formula list 1160 that apply to the same element or cell 1054, including formula 774 and formula 1178. The tuple 772 for formula 774 includes the element or cell 1054 specified by the tuple 1176. Which of these formulas 774 and 1178 is applied can be determined in a number of ways. If the implementation calls for a subsequent formula to modify the result of a previously-applied formula, the previously-applied formula would first be applied, then its result would be modified by the formula that operates on that result.

On the other hand, if the formulas both operate on the original value populating the report, according to one implementation of the present disclosure, a formula whose tuple specifies fewer or the fewest delimited positions will take priority over other formulas. If a formula, like formula 1178, is specifically applied to a selected element or cell, it suggests that the formula is significant to the person applying that formula. Alternatively, the priority could be determined by which formula was applied more recently, by which user applied the formula, or whether, relative to the user making use of the report, whether the formula is a design-time formula or a run-time formula. If desired, these types of information may be stored in the formula list to help differentiate application of the rules if there is a conflict.

In the case of design-time formulas created by report designers as opposed to run-time formulas created by users, the formula list may be keyed so that run-time formulas only will be applied when that user or a group of users access the report. Certainly, design-time formulas also could be associated with specifications as to which users and/or groups of users for which such a formula is to be applied. In one implementation, if a user is associated with a run-time formula, the run-time formula will take precedence over a conflicting design-time formula on the assumption that the run-time formula is specifically adapted to serve that particular user or group of users with which the run-time formula is associated.

Second, formulas applied to reports may be stored in one or more lists. Whether the formulas include design-time formulas or run-time formulas, multiple lists may be maintained and associated with the report. As a result, formulas created or appropriate for one user or a group of users may be stored in one formula list, while other formulas associated or appropriate for other users are stored in one or more other lists. An implementation of the present disclosure in which multiple lists are used is described with reference to the next figure, FIG. 12.

Figure 12:
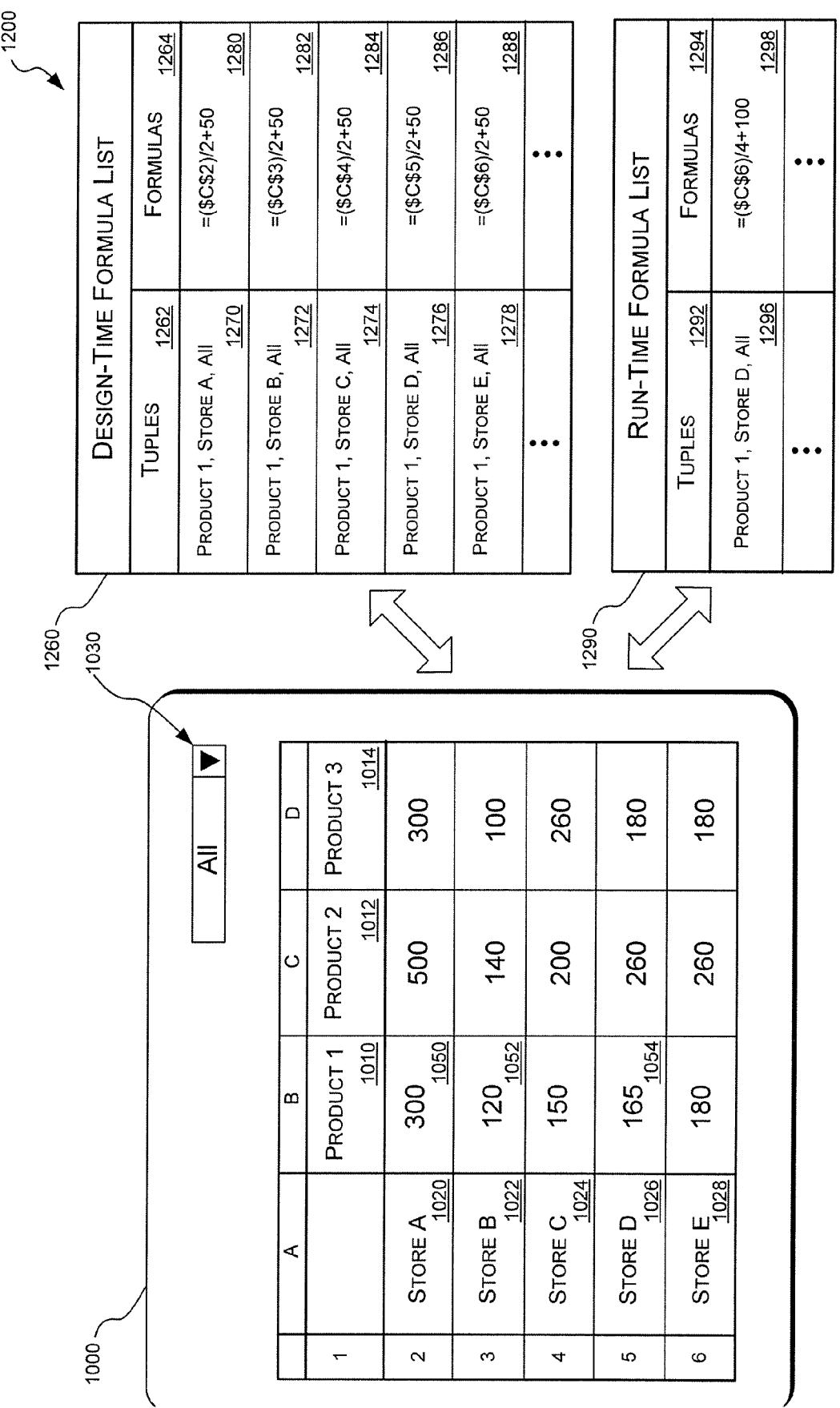
FIG. 12 is a screen view of the modified sample report of FIG. 10 and design-time and run-time formula lists according to an implementation of the present disclosure.

FIG. 12 shows a combined report 1200 including the report 1000 and multiple formula lists 1260 and 1290 associated with the report 1000. Specifically, the combined report 1200 includes two formula lists: a design-time formula list 1260 and a run-time formula list 1290. In FIG. 12, the formula lists 1260 and 1290 include lists of tuples 1262 and 1292 specified in terms of the content of the cells to which they will be applied by, for example, product and store. By contrast, the lists of formulas 1264 and 1294 are presented in terms of spreadsheet syntax in terms of report positions, such as column C and row 3. Implementations of the present disclosure allow for the tuples and formulas to be specified in different ways.

For sake of this example, it is assumed that the first formula applied to yield report 500 (FIG. 5), the formula 540 of Eq. (1), was a design-time formula created by designers of the report. On the other hand, it is assumed that the second formula applied to yield the report 1000, the formula 1040 of Eq. (9), is a run-time formula created by users of the report. These assumptions, however, are arbitrary: designers are not limited to formulas applied to multiple elements or cells, as the formula 540 of Eq. (1) was applied, and users are not limited to single-element formulas as the formula 1040 of Eq. (10) was applied. In addition, formulas may be applied by different designers or users in different orders. For example, despite the sequential presentation of the formulas 540 and 1040 in this description, the formula 1040 could have been designed and applied by a user before the formula 540 was created and applied by the designers of the report. Design and application of formulas may be an iterative, on-going process through which reports are continually modified and updated.

In the example of FIG. 12, the design-time formula list 1260 includes the tuples 1270-1278 the tuple list 1262 and the formulas 1280-1288 in the formula list 1264. The formulas 1280-1288 will be applied to reports run by any user to which the design-time formula list 1260 is made available. In one implementation of the present disclosure, the design-time formula list 1260 is included in the metadata with the combined report 1200 and, thus, will be applied to the report for all users. In another implementation, the combined report 1200 that includes the design-time formula list 1260 in its metadata is made available only to specified users or groups of users. Further alternatively, in still another implementation, the design-time formula list 1260 will be made available in the metadata accessible to all users, but the formulas included in the design-time formula list 1260 will only be applied when the report 1000 is accessed by specified users or groups of users.

The run-time formula list 1290 includes the tuple 1296 in the tuple list 1292 and the formula 1298 in the formula list 1294. The formula 1288 will be applied to reports run by the user who created and applied the formula, as well as any other users with whom the user shares the run-time formula list 1290. For example, the user may create the formula 1298 for other user who work with Store D 1026, to which the formula 1298 is applicable. The run-time formula list 1290 may be stored in metadata in a version of the combined report 1200 that is stored where accessible by the user and/or the group with which the user is associated. Alternatively, as previously described, the run-time formula list 1290 may be associated with a combined report 1200 accessible to anyone across the enterprise, but may only be applied for the specified user or users or if otherwise elected by designers or other users of the report. Implementations of the present disclosure are not restricted by how or where the formula lists are stored, whether stored with the reports, with separate version of the reports, or stored separately from the reports.

Processes of Designing and Applying Formulas to a Report

Figure 13:
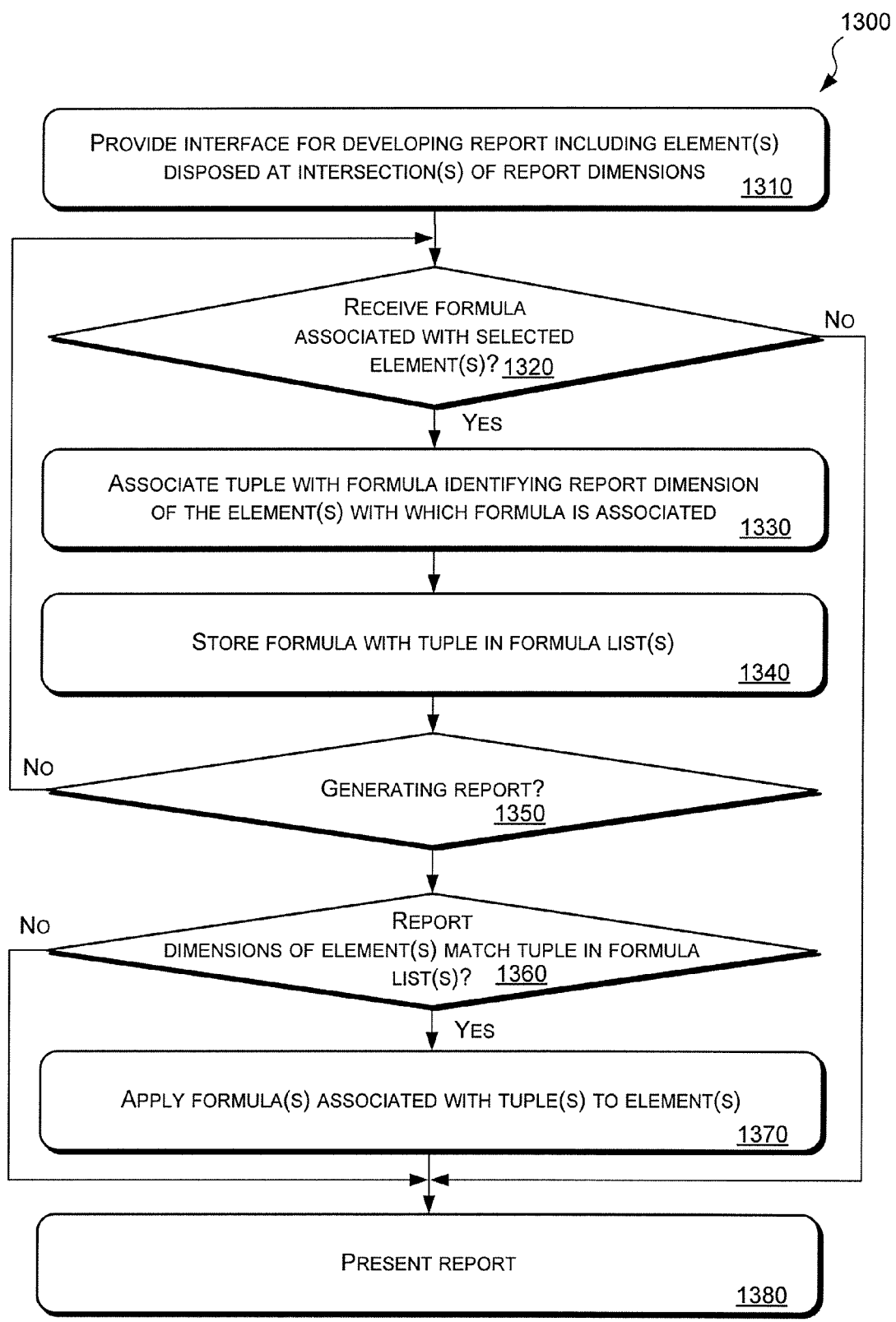
FIGS. 13 and 14 are flow diagrams of processes according to implementations of the present disclosure.

FIG. 13 presents a flow diagram 1300 of a process according to an implementation of the present disclosure for designing and applying one or more formulas to a report. At 1310, an interface is provided for designing a report, the report including elements or cells disposed at intersections of the report positions. In the preceding examples of FIGS. 3-12, the interface was presented as a spreadsheet interface or a spreadsheet application showing a reporting including a plurality of elements in the form of spread sheet cells. The report, as presented in the report 400 (FIG. 4) is associated with one or more databases and may be populated with values retrieved or derived from the database by one or more queries designed by database programmers or report designers. The formulas, as previously described, are then applied to the current values that will populate the report when the report is generated.

At 1320, it is determined if one or more formulas are received and associated with one or more elements or cells in the report, as described with reference to FIGS. 5 and 7. If not, the flow diagram 1300 proceeds to 1380, where the report is presented. However, if it is determined at 1320 that one or more formulas are received, at 1330, a tuple or tuples identifying the elements or cells with which the formula or formulas are applied are associated with the respective formulas. As previously described, in one implementation of the present disclosure, the tuples are specified in terms of the content of the elements rather than positional ranks so that modification of the underlying report will not necessitate rewriting of the formulas. At 1340, the formula or formulas and their associated tuple or tuples are then stored in one or more formula lists. Again, as previously described, a report may be associated with a single formula list including all of the formulas applied to the report, one or more design-time formula lists, and/or one or more run-time formula lists.

At 1350, it is determined if the report is being generated to apply formulas included in the one or more formula lists. If not, the flow diagram 1300 reverts to 1320 to determine if formulas are being applied to the report. On the other hand, if it is determined at 1350 that the report is being generated, at 1360, it is determined if elements or cells of the report include report positions that match one or more tuples associated with formulas in the formula list. Again, according to one implementation of the present disclosure, the report positions in the tuples are specified by content, such as by store or product in the foregoing examples of FIGS. 3-12, and these content-based report positions are compared with content-based tuples to determine if the formula list or lists include formulas to be applied to the report. If so, at 1370, the formulas associated with the matching tuple or tuples are applied to the elements or cells in the report indicated by the tuple or tuples. If no matching tuple or tuples are identified, or once the formulas are applied at 1370, at 1380, the report is presented.

Figure 14:
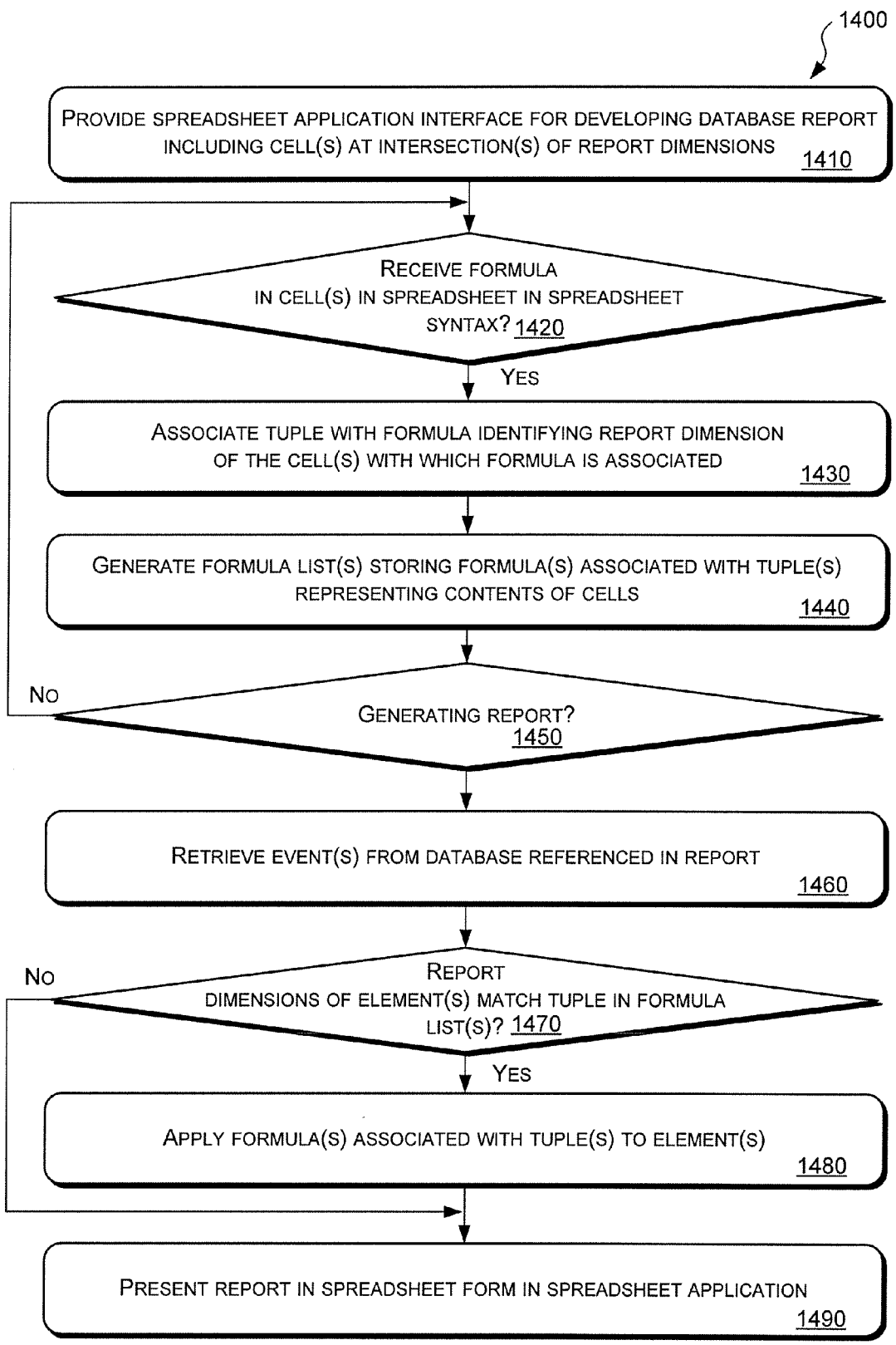

FIG. 14 presents a flow diagram 1400 of a process according to another implementation of the present disclosure for designing and applying one or more formulas to a report. At 1410, a spreadsheet interface is provided for designing a database report, the report including cells at intersections identified by spreadsheet coordinates. Again, report is associated with one or more databases and may be populated with values retrieved or derived from the database by one or more queries designed by database programmers or report designers. The formulas, as previously described, are then applied to the current values that will populate the report when the report is generated.

At 1420, it is determined if one or more formulas are received in the spreadsheet in a spreadsheet syntax. As previously described, the spreadsheet formulas may be provided by manipulating the spreadsheet and/or by editing the text of the formulas. If not, the flow diagram 1400 proceeds to 1490, where the report is presented. However, if it is determined at 1420 that one or more formulas are received, at 1430, a tuple or tuples identifying by their spreadsheet coordinates the cells with which the formula or formulas are applied are associated with the respective formulas. As previously described, in one implementation of the present disclosure, the tuples are specified in terms of the content of the elements rather than positional ranks so that modification of the underlying report will not necessitate rewriting of the formulas. At 1440, the formula or formulas and their associated tuple or tuples are then stored in one or more formula lists. Again, a report may be associated with a single formula list including all of the formulas applied to the report, one or more design-time formula lists, and/or one or more run-time formula lists.

At 1450, it is determined if the report is being generated to apply formulas included in the one or more formula lists. If not, the flow diagram 1400 reverts to 1420 to determine if formulas are being applied to the report. On the other hand, if it is determined at 1450 that the report is being generated, at 1460, current data from the database are retrieved to populate the report with current data. At 1470, it is determined if cells of the spreadsheet report include cells identified by spreadsheet coordinates that match one or more tuples associated with formulas in the formula list. Again, according to one implementation of the present disclosure, the spreadsheet coordinates in the tuples are specified by content, such as by store or product in the foregoing examples of FIGS. 3-12, although other expressions of the spreadsheet coordinates may be used. If so, at 1480, the formulas associated with the matching tuple or tuples are applied to the elements or cells in the report indicated by the tuple or tuples. If no matching tuple or tuples are identified, or once the formulas are applied at 1480, at 1490, the report is presented.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
providing a spreadsheet application interface for designing a report including a plurality of cells, each of the cells being disposed at an intersection of a spreadsheet coordinates corresponding with and configured to present information derived from data retrievable from a multidimensional database;
in one or more of the cells of the spreadsheet, receiving a run-time formula specified in syntax understandable by the spreadsheet application that is stored separately from the report, the formula being configured to generate a result in the one or more cells that modifies a result of the report;
associating a tuple with the formula identifying the spreadsheet coordinates of the one or more cells with which the formula is associated, the spreadsheet coordinates being specified in terms of content represented by the row and column addresses;
generating a formula list associated with the report, the formula list including an entry for the tuple and the formula associated with the tuple;
storing the formula list in metadata associated with the report; and
configuring the report to be locally generated in the spreadsheet application, wherein locally generating the report includes:
retrieving the data from the multidimensional database referenced in the report;
determining whether the report includes the spreadsheet coordinates corresponding to the tuple in the formula list;
prioritizing an application of formulas in the formula list when at least two formulas operate on a same value within the report;
applying the formula stored in the formula list to the one or more cells in the report having the spreadsheet coordinates identified by the tuple; and
displaying the report as a spreadsheet in the spreadsheet application including results generated by the application of the formula.

2. The computer-implemented method of claim 1, wherein:
the spreadsheet coordinates identify an intersection of a row, a column, and one or more additional positions included in the report; and
the tuple associated with the formula identifies the spreadsheet coordinates according to a row position, a column position, and the one or more other additional report positions of the one or more cells included in the report with which the formula is associated.

3. The computer-implemented method of claim 1, wherein the spreadsheet coordinates identified by the tuple include one or more delimited parameters identifying multiple cells.

4. The computer-implemented method of claim 1, wherein prioritizing the application of formulas comprises prioritizing the application of formulas according by which of the tuples includes fewer delimited parameters.

5. The computer-implemented method of claim 1, wherein the spreadsheet coordinates identified by the tuple include parameters indicating the substantive content of the one or more selected elements such that the tuple identifies the formula based on the report positions independent of physical dimensions of the report.

6. The computer-implemented method of claim 1, further comprising receiving:
a design-time formula prepared by a designer of the report, and the formula list in which the design-time formula is stored includes a design-time formula list; and
wherein the run-time formula is prepared by a user of the report, and the formula list in which the run-time formula is stored includes a run-time formula list.

7. The computer-implemented method of claim 6, wherein access to the one or more of the design-time formula list and the run-time formula list is designated to one or more of:
one or more specified users; and
one or more groups of users.

8. A computer-readable medium, excluding transmission media, storing instructions executable by a computing system, comprising instructions to:
providing a spreadsheet application interface for designing a report including a plurality of cells, each of the cells being disposed at an intersection of a spreadsheet coordinates corresponding with and configured to present information derived from data retrievable from a multidimensional database;
in one or more of the cells of the spreadsheet, receiving a run-time formula specified in syntax understandable by the spreadsheet application that is stored separately from the report, the formula being configured to generate a result in the one or more cells that modifies a result of the report;
associating a tuple with the formula identifying the spreadsheet coordinates of the one or more cells with which the formula is associated, the spreadsheet coordinates being specified in terms of content represented by the row and column addresses;
generating a formula list associated with the report, the formula list including an entry for the tuple and the formula associated with the tuple;

storing the formula list in metadata associated with the report; and configuring the report to be locally generated in the spreadsheet application, wherein locally generating the report includes:

retrieving the data from the multidimensional database referenced in the report;

determining whether the report includes the spreadsheet coordinates corresponding to the tuple in the formula list;

prioritizing an application of formulas in the formula list when at least two formulas operate on a same value within the report;

applying the formula stored in the formula list to the one or more cells in the report having the spreadsheet coordinates identified by the tuple; and displaying the report as a spreadsheet in the spreadsheet application including results generated by the application of the formula.

9. The computer-readable medium of claim 8, wherein:

the spreadsheet coordinates identify an intersection of a row, a column, and one or more additional positions included in the report; and the tuple associated with the formula identifies the spreadsheet coordinates according to a row position, a column position, and the one or more other additional report positions of the one or more cells included in the report with which the formula is associated.

10. The computer-readable medium of claim 8, wherein the spreadsheet coordinates identified by the tuple include one or more delimited parameters identifying multiple cells.

11. The computer-readable medium of claim 8, wherein prioritizing the application of formulas comprises prioritizing the application of formulas using which of the tuples includes fewer delimited parameters.

12. The computer-readable medium of claim 8, wherein the spreadsheet coordinates identified by the tuple include parameters indicating the substantive content of the one or more selected elements such that the tuple identifies the formula based on the report positions independent of physical dimensions of the report.

13. The computer-readable medium of claim 8, further comprising receiving: a design-time formula prepared by a designer of the report, and the formula list in which the design-time formula is stored includes a design-time formula list; and wherein the run-time formula is prepared by a user of the report, and the formula list in which the run-time formula is stored includes a run-time formula list.

14. The computer-readable medium of claim 13, wherein access to the one or more of the design-time formula list and the run-time formula list is designated to one or more of: one or more specified users; and one or more groups of users.

15. A system, comprising:

a processor and a computer-readable medium;

the processor configured to perform actions, comprising:

providing a spreadsheet application interface for designing a report including a plurality of cells, each of the cells being disposed at an intersection of a spreadsheet coordinates corresponding with and configured to present information derived from data retrievable from a multidimensional database;

in one or more of the cells of the spreadsheet, receiving a run-time formula specified in syntax understandable by the spreadsheet application that is stored separately from the report, the formula being configured to generate a result in the one or more cells that modifies a result of the report;

associating a tuple with the formula identifying the spreadsheet coordinates of the one or more cells with which the formula is associated, the spreadsheet coordinates being specified in terms of content represented by the row and column addresses;

generating a formula list associated with the report, the formula list including an entry for the tuple and the formula associated with the tuple;

storing the formula list in metadata associated with the report; and configuring the report to be locally generated in the spreadsheet application, wherein locally generating the report includes:

retrieving the data from the multidimensional database referenced in the report;

determining whether the report includes the spreadsheet coordinates corresponding to the tuple in the formula list;

prioritizing an application of formulas in the formula list when at least two formulas operate on a same value within the report;

applying the formula stored in the formula list to the one or more cells in the report having the spreadsheet coordinates identified by the tuple; and displaying the report as a spreadsheet in the spreadsheet application including results generated by the application of the formula.

16. The system of claim 15, wherein:

the spreadsheet coordinates identify an intersection of a row, a column, and one or more additional positions included in the report; and the tuple associated with the formula identifies the spreadsheet coordinates according to a row position, a column position, and the one or more other additional report positions of the one or more cells included in the report with which the formula is associated.

17. The system of claim 15, wherein the spreadsheet coordinates identified by the tuple include one or more delimited parameters identifying multiple cells.

18. The system of claim 15, wherein prioritizing the application of formulas comprises determining which of the tuples includes fewer delimited parameters.

19. The system of claim 15, wherein the spreadsheet coordinates identified by the tuple include parameters indicating the substantive content of the one or more selected elements such that the tuple identifies the formula based on the report positions independent of physical dimensions of the report.

20. The system of claim 15, further comprising receiving: a design-time formula prepared by a designer of the report, and the formula list in which the design-time formula is stored includes a design-time formula list; and wherein the run-time formula is prepared by a user of the report, and the formula list in which the run-time formula is stored includes a run-time formula list.

* * * * *